Patented Nov. 13, 1923.

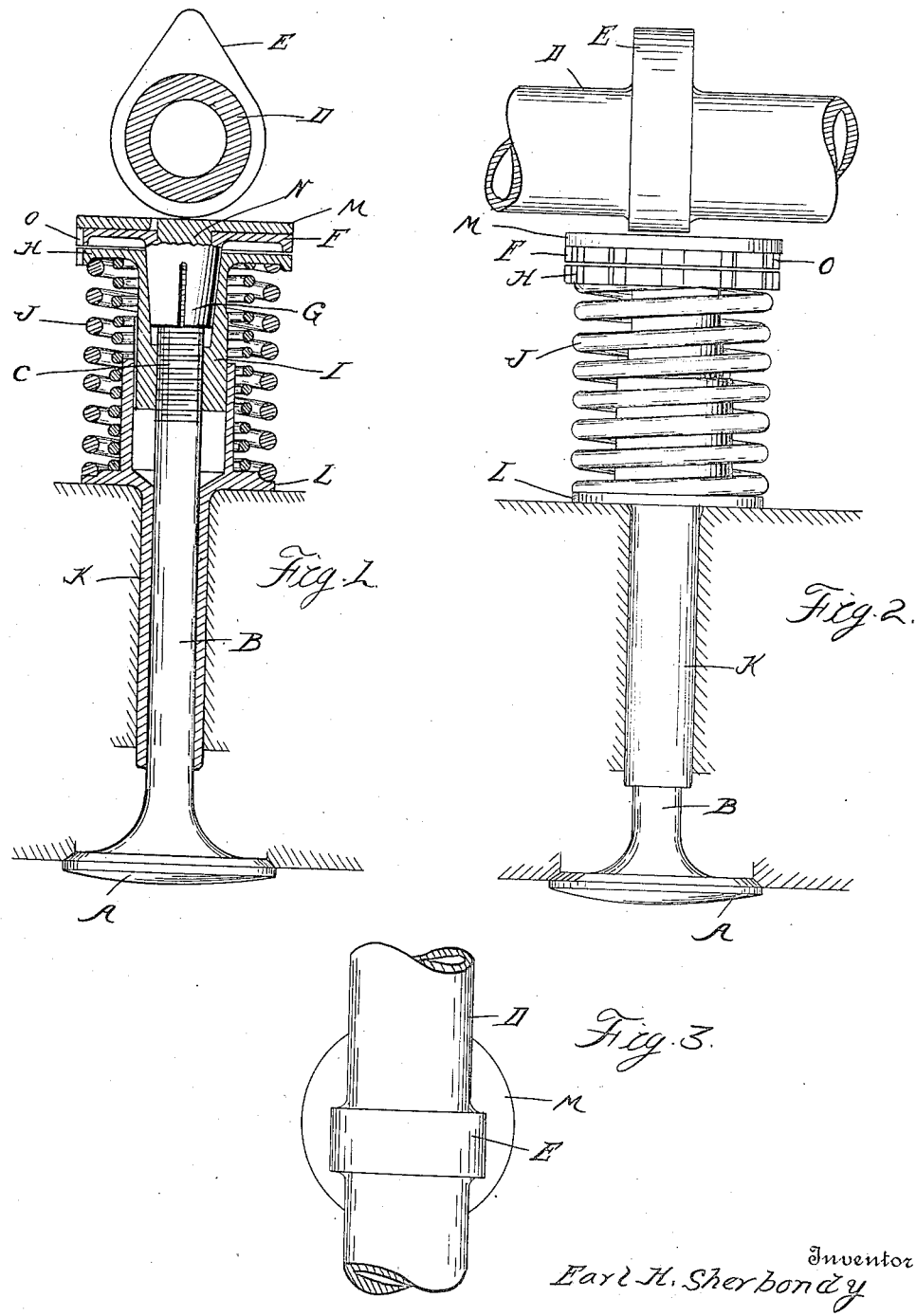

1,473,711

UNITED STATES PATENT OFFICE.

EARL H. SHERBONDY, OF DETROIT, MICHIGAN, ASSIGNOR TO SIDNEY D. WALDON, OF DETROIT, MICHIGAN.

POPPET VALVE.

Application filed April 9, 1920. Serial No. 372,641.

*To all whom it may concern:*

Be it known that I, EARL H. SHERBONDY, a citizen of the United States of America, residing at Detroit, in the county of Wayne and State of Michigan, have invented certain new and useful Improvements in Poppet Valves, of which the following is a specification, reference being had therein to the accompanying drawings.

The invention relates to poppet valves of that type in which the actuating cam directly engages the end of the valve stem. It is the object of the invention to obtain a construction permitting of adjustment of the length of the stem and also rigidly locking the same in its position of adjustment. It is a further object to provide a shifting surface for contact with the cam, which avoids unequal wear. With these and other objects in view the invention comprises the construction as hereinafter set forth.

In the drawings:

Figure 1 is a longitudinal section, partly in elevation, in the plane of the axis of the valve stem;

Figure 2 is an elevation viewed at right angles to Figure 1;

Figure 3 is a plan view thereof.

A is the poppet valve, which is provided with an integral stem B having a threaded portion C at its outer end. D is the cam shaft arranged in the axial plane of the stem and having its axis perpendicular to the axis of the stem. E is the cam upon the shaft D which rotates in a plane slightly offset from the axis of the stem.

The cam E actuates the stem B by engaging a bearing face thereon, which is in a plane perpendicular to the axis of the stem. This bearing face must, however, be adjustable in relation to the stem, so as to provide for proper seating of the valve and to avoid excessive clearance, which would result in noise and wear. It is also essential that the adjustment means shall be rigidly locked during operation to avoid displacement. I have, therefore, devised an exceedingly simple and effective adjustment and locking means which is constructed as follows:

F is a disk or head member provided with a hub portion G internally threaded for engaging the threaded portion C of the stem. H is a second disk or head member also provided with a hub portion I of greater length and having its outer end internally threaded for engagement with the threaded portion C. The hub I is of greater diameter than the hub G and is recessed to receive the latter. The recess is also of a tapering form, while the hub G is correspondingly tapered to form a wedged engagement therewith. The hub G is further longitudinally slotted to be collapsible in diameter so that the wedging action of the hub I thereupon will cause a firm clamping of the threaded portion of the hub G to the threads on the stem B.

The disk or head H forms a collar or abutment for one end of a spring J for closing the valve against its seat, while the hub I forms a guide for slidably engaging the bearing for the stem. As shown, the bearing for the stem comprises a member K which is recessed to receive the hub I and has a portion of smaller diameter for directly engaging the stem B. It is also provided with a flange L, which forms the opposite abutment for the spring J.

M is a disk member having a hardened outer face for contacting with the cam E and provided with a central hub N, which engages a recess in the head or disk F, so as to be rotatable therein.

With the construction as described to adjust the valve in relation to the cam, the disk or head H is turned by means of a suitable tool engaging peripheral notches O therein so as to back the hub I away from the hub G, releasing the clamping pressure thereon. This will permit adjustment of the disk F towards or from the cam, so that the valve will seat and the clearance between the member M and the cam will be as small as desirable. The member F may then be locked by turning the member H in a reverse direction, which wedges against the hub G. This not only holds the member H from turning, but also takes up all clearance between the threads of the hub G and the threads C on the stem, so that the structure will be perfectly rigid.

In operation, during the revolution of the cam E, it will actuate the member F longitudinally of the axis of the stem to lift and seat the valve and at the same time the member F will be revolved, due to its offset relation to the axis of the stem. This will change the area of contact and will avoid wearing in one spot.

What I claim as my invention is:

1. The combination with a poppet valve and its actuating stem, of a head member having a hub threaded upon said stem, said hub being slitted to permit of radial contraction, a second head member below the member aforesaid and provided with a relatively long hub having a portion surrounding the first-mentioned hub and adapted to clamp the same upon said stem and having a portion threaded upon said stem below the first-mentioned hub, the second member and its hub being adjustable toward the valve to permit adjustment of the first-mentioned member and its hub in either direction upon the stem, said second member and hub being also adjustable to clamp the first-mentioned hub in adjusted position on said stem.

2. The combination with a poppet valve and its actuating stem, of a head member having a hub, threaded upon said stem, a second head below the member aforesaid provided with a relatively long hub having a portion surrounding the hub aforesaid and adapted to clamp the same upon said stem, the second hub also having a cylindrical portion threaded upon said stem below the first-mentioned hub, and a bearing for said stem having a portion receiving the cylindrical portion of the second-mentioned hub, and having a portion of smaller diameter directly engaging said stem below the second-mentioned hub.

3. The combination with a poppet valve and its actuating stem, of a head member having a hub threaded upon said stem, a second head below the member aforesaid provided with a relatively long hub surrounding the hub aforesaid and adapted to clamp the same upon said stem, the second hub having a cylindrical portion threaded upon said stem below the first-mentioned hub, and a bearing for said stem having a portion receiving the cylindrical portion of the second-mentioned hub and having a portion of smaller diameter directly engaging said stem below the second-mentioned hub, a flange upon said bearing and a coil spring surrounding said bearing and the second-mentioned hub between the second mentioned member and said flange.

4. The combination with a poppet valve and its actuating stem, of a head member having a hub threaded upon said stem, a second head member below the member aforesaid and provided with a relatively long hub having a portion surrounding the first-mentioned hub and adapted to clamp the same upon said stem, the second hub also having a portion threaded upon said stem below the first-mentioned hub, the second member and its hub being adjustable toward the valve to permit adjustment of the first-mentioned member and its hub in either direction upon the stem, said second member and hub being also adjustable away from the valve to clamp the first-mentioned hub in adjusted position upon said stem, and a disk having a hardened outer surface for engagement with a cam and having a hub rotatably mounted in the first-mentioned member.

In testimony whereof I affix my signature.

EARL H. SHERBONDY.